United States Patent [19]
Paleologou et al.

[11] Patent Number: 5,922,171
[45] Date of Patent: Jul. 13, 1999

[54] METHOD AND APPARATUS FOR REMOVING SODIUM CHLORIDE FROM PULPING CHEMICALS USING AN AMPHOTERIC ION-EXCHANGE RESIN

[75] Inventors: Michael Paleologou, Beaconsfield; Rokhsareh Thompson, Point Claire; Richard McKinnon Berry, Ille Perrot; Michael A. Sheedy, North York; Craig J. Brown, Pickering, all of Canada

[73] Assignees: Eco-tec Limited, Pickering; Pulp and Paper Research Institute of Canada, Point-Claire, both of Canada

[21] Appl. No.: 08/788,181

[22] Filed: Jan. 24, 1997

[51] Int. Cl.$^6$ .................................................. D21C 11/00
[52] U.S. Cl. .................... 162/29; 162/30.11; 162/239; 210/686; 423/181
[58] Field of Search ........................... 162/29, 30.1, 239, 162/240; 204/522, 523, 525, 539; 210/686; 423/181

[56] References Cited

U.S. PATENT DOCUMENTS

| | | | |
|---|---|---|---|
| 3,041,292 | 6/1962 | Hatch | 260/2.1 |
| 3,078,140 | 2/1963 | Hatch | 23/1 |
| 3,205,184 | 9/1965 | Hatch | 260/2.1 |
| 3,332,890 | 7/1967 | Hatch | 260/2.1 |
| 3,698,995 | 10/1972 | Rapson | 162/16 |
| 4,039,372 | 8/1977 | Reeve et al. | 162/19 |

(List continued on next page.)

FOREIGN PATENT DOCUMENTS

| | | |
|---|---|---|
| 575049 | 4/1959 | Canada . |
| 55-90693 | 7/1980 | Japan . |

OTHER PUBLICATIONS

"Removal of Sodium Chloride from Kraft Recovery System": Pulp Paper Mag. Can. 75(4): T150 (Apr. 1974) by W.A. Moy, Peter Joyce and G.E. Styan.

"Removal of Chloride and Potassium from the Kraft Recovery Cycle": Paper by Paul F. Earl, P. David Kick and Jean–Claude Patel.

"Preparation and Use of Snake–Cage Polyelectrolytes": Industrial and Engineering Chemistry vol. 49 No. 11 Nov. 1957 by Melvin J. Hatch, John A. Dillon and Hugh B. Smith. Dow Chemical Company, Ion Retardation Technical Service and Development, Dow Chemical Company ed.; 1957 Apr. 27.

Blackwell, B. ., "Recycle of . . . Analysis", 1992 International Chemical Recovery Conference, pp. 329–350, Jun. 1992.

*Primary Examiner*—Stanley S. Silverman
*Assistant Examiner*—Dean T. Nguyen
*Attorney, Agent, or Firm*—Bereskin & Parr

[57] ABSTRACT

Sodium chloride is removed from pulping chemicals used in a Kraft pulping process by the use of a snake-cage polyelectrolyte ion exchange resin, coupled with removal of sulfide prior to treatment, or treatment of chemicals which are already low in sulfide. In one aspect of the invention, dust is collected from exhaust gases produced in the black liquor recovery cycle and is dissolved in water to produce a solution containing sodium chloride and sodium sulfate. The solution is filtered to yield a solid product and a filtrate solution. The filtrate solution is fed to an ion exchange unit which removes chloride and produces a purified sodium sulfate product. The sodium chloride is removed from the ion exchange resin by water elution, and useful recovered chemicals are recycled to the recovery cycle of the Kraft process. In one embodiment, only a portion of the dust is dissolved so that the solid product produced by filtering is primarily sodium sulfate, and that sodium sulfate is recycled to the recovery cycle of the Kraft process. In another aspect of the invention, white liquor from the pulping process is treated directly after oxidizing sulfide to sulfate. After removal of sodium chloride in the ion exchange unit, the treated white liquor can be used as a source of sodium hydroxide for oxygen delignification, and the effluent from the oxygen delignification stage can be returned to the process.

27 Claims, 6 Drawing Sheets

U.S. PATENT DOCUMENTS

| | | | |
|---|---|---|---|
| 4,150,205 | 4/1979 | Wheaton | 423/181 |
| 4,154,801 | 5/1979 | Wheaton | 423/181 |
| 4,235,717 | 11/1980 | Lee et al. | 210/685 |
| 4,478,722 | 10/1984 | Boom | 210/672 |
| 4,556,463 | 12/1985 | Minz et al. | 204/98 |
| 5,352,332 | 10/1994 | Maples et al. | 162/30.1 |
| 5,536,384 | 7/1996 | Thompson et al. | 204/522 |

METHOD AND APPARATUS FOR REMOVING SODIUM CHLORIDE FROM PULPING CHEMICALS USING AN AMPHOTERIC ION-EXCHANGE RESIN

FIELD OF THE INVENTION

This invention relates generally to the Kraft process for the production of bleached cellulosic fibrous pulp. The invention is concerned more particularly with an improvement in the Kraft process by which impurities such as chloride, as well as minor non-process elements such as calcium, manganese, iron and zinc can be removed from pulping chemicals used in the process.

BACKGROUND OF THE INVENTION

In the Kraft process, cellulosic fibrous feed material (wood) is heated in a digestion stage with a "white liquor" which contains sodium sulfide and sodium hydroxide to dissolve hemicelluloses, lignin and other extractable or organic materials contained in the fibrous material. The digested fibrous pulp so obtained is separated from the resultant "black liquor", the latter being sent to a recovery stage and the former being sent to a bleaching stage. The above process is of particular application to the pulping of wood chips.

In the recovery stage, the black liquor is concentrated by evaporation of water therefrom and the concentrated liquor is then burned in a boiler (sometimes referred to as a "furnace") to yield a smelt containing sodium carbonate and sodium sulfide. The smelt is quenched with water to form a raw "green liquor" which is then clarified. The clarified green liquor is causticized with lime to convert the sodium carbonate present in the liquor to sodium hydroxide. Calcium carbonate is precipitated during the causticization of the liquor and is separated therefrom as a mud and calcined to regenerate lime for further causticization. The filtered causticized green liquor is the white liquor which is used in the digestion stage and is recycled to treat further fibrous material.

An appreciable portion of the inorganic chemicals contained in the black liquor are lost to the recovery boiler flue gas, either by entrainment or volatilization. To conserve chemicals it is common practice to collect dust by electrostatic precipitation (ESP dust) from the boiler exhaust, and recycle the dust by redissolution of same in the black liquor. Additional sodium sulfate is usually added to the process to make up any net loss of chemicals in the cycle.

In the Kraft process described above, sodium chloride and other impurities entering with the wood and input chemicals tend to build up to a steady state concentration in the pulping liquors since they have no deliberate outlet. This is a particular problem for coastal mills such as those located on the coast of British Columbia where logs are transported in seawater and become saturated in chloride. Other than in exceptional cases such as these coastal mills, chloride contamination has not been a serious problem in the past, as impurity outlets occur due to normal spills, leakages and other losses. As mills improve their operating practices however, there is a reduced outlet for contamination and an increasing tendency for build-up of impurities. Means of removal of contaminants is becoming increasingly necessary.

The pulp produced in the Kraft mill is subjected to bleaching and purification in a bleach plant operation. Treatment chemicals, commonly in aqueous solutions, and wash water are used in the bleaching and purification of the pulp, and result in one or more aqueous bleach plant effluents containing spent chemicals and spent wash water. Such bleach plant effluents usually are discharged, after treatment, to water bodies. The treatment of bleach plant effluents represents considerable expense. The possibility of recycling bleach plant effluents to eliminate their discharge and associated treatment is very attractive and has been an industry goal for some time. Recycling of bleach plant effluent would go a long way towards elimination of pollution from pulp mill operations.

In 1972, Rapson patented (U.S. Pat. No. 3,698,995) a process for reducing the discharge of the bleach plant effluent by recycling the filtrates to the pulping liquor regeneration process. This process was later improved by Reeve et al. in U.S. Pat. No. 4,039,372. The Rapson/Reeve process was installed at Great Lakes Paper in Thunder Bay, Ontario and began operation in 1977 but was abandoned in 1985. One of the main reasons for the apparent failure of this process was related to concerns regarding corrosion and pulp quality because of inadequate removal of chloride contamination. Chloride originating from chlorine based chemicals used in pulp bleaching, was recycled with the bleach filtrate to the kraft recovery process from whence it had no adequate outlet.

The Rapson/Reeve process included some provision for chloride removal by evaporation and crystallization of sodium chloride from white liquor. This chloride removal process did not prove sufficient, however.

In the Kraft pulping chemical recovery cycle, it is well-known that chloride and potassium become enriched relative to sodium sulfate in the flue gas dust retained by the electrostatic precipitator in the recovery boiler. These elements decrease the melting point of the dust, leading to plugging of the boiler tubes, which leads to decreased boiler efficiency. This impurity enrichment has an beneficial aspect, however and several prior art processes have taken advantage of this enrichment to facilitate removal of chloride and potassium impurities from the Kraft pulping process.

A improved process for recycling bleach plant filtrate (called BFR) is disclosed in U.S. Pat. No. 5,352,332 (Maples et al.) and was recently installed at the Canton N.C. mill of Champion International. A key feature of the BFR process is its ability to remove chlorine and potassium contamination from the Kraft pulping process by treatment of the electrostatic precipitator (ESP) dust catch. According to the patent this is done by selectively leaching the chloride and potassium from the dust with a minimal amount of water or by recrystallizing sodium sulfate after dissolution of the dust in water.

The leaching technique is described in more detail by Moy et al. ("Removal of Sodium Chloride from Kraft Recovery System": Pulp Paper Mag. Can. 75(4): T150 (April 1974)). The basic principle of this leaching process is that sodium chloride is much more soluble that sodium sulfate. In fact, the solubility of sodium sulfate in a saturated solution of sodium chloride is significantly reduced, according to the well-known common ion effect. The idea is to add just enough water to dissolve the sodium chloride, leaving most of the sodium sulfate behind. In practice this idea is unworkable as it produces a thick non-pumpable paste containing 45–60% undissolved solids. One reason that this material is difficult to filter is the presence of fine particles of oxides of non-process elements such as calcium, manganese, iron, zinc etc which are mixed in with the sodium salts.

Moy found that by decreasing the solids concentration to 20–25% the slurry became workable. However the dilution water dissolved much more sodium sulfate, which would then be lost to waste with the sodium chloride. This problem was partially overcome by using a saturated solution of sodium chloride/sodium sulfate instead of water to dilute the thick slurry. In practice, the slurry is dewatered using, for example, a rotary drum vacuum filter. A portion of the filtrate, which is a saturated solution of sodium chloride/sodium sulfate is then recycled for use in diluting the slurry.

The other problem with the basic leaching process is that sodium carbonate, a valuable component of the dust, is leached out of the liquor along with the sodium chloride. Moy overcame this problem by converting the sodium carbonate to sodium sulfate by neutralizing the salt slurry to a pH of 3.5 to 5.5 using sulfuric acid. This additional sodium sulfate was largely retained with the solids removed by the filter.

When Champion International installed the BFR system discussed above, they determined that the dust leaching process described above was not satisfactory. Several shortcomings were cited. According to Earl ("Removal of Chloride and Potassium from the Kraft Recovery Cycle": Paper by Paul F. Earl, P. David Kick and Jean-Claude Patel), the leaching process does not effectively remove potassium from the system. In addition, the amount of sodium sulfate lost with the sodium chloride in the filtrate was still considered excessive.

A new process, developed by Sterling Pulp Chemicals, was installed at Champion wherein all of the dust is dissolved in water. Sulfuric acid is added to convert sodium carbonate to sodium sulfate. The liquor is then concentrated by evaporation. Sodium sulfate is then recrystallized from the concentrated liquor and separated from the sodium chloride liquor by filtration. A portion of the filtrate, containing sodium chloride as well as potassium chloride is purged from the system. According to Earl, the amount of sodium sulfate lost is much less with this system than with the leaching process of the prior art. It is claimed that this process recovers 90% of the sodium sulfate values in the dust while removing 90% of the chloride and greater than 60% of the potassium. In addition, it is claimed that the relatively coarse sodium sulfate crystals are much easier to filter than the fine dust particles of the leaching process.

While apparently quite effective in its operation, the major disadvantage of the recrystallization process is the high capital and operating cost associated with the evaporator employed to concentrate the dissolved dust liquor.

A common problem with all of the above described prior art processes is that non-process elements such as calcium, manganese, iron and zinc which are present in the ESP dust are largely insoluble in water. As a result they are filtered out along with the recovered sodium sulfate and recycled back to the kraft pulping process. It is well known that these non-process elements are undesirable and a process which also removes these non-process elements would be preferred.

SUMMARY OF THE INVENTION

Broadly speaking, the invention is based on the recognition that it is possible to purify pulping chemicals used in a Kraft pulping process by treating the chemicals with an amphoteric ion exchange resin to remove sodium chloride, if the pulping chemicals are collected from the process at a point at which the sulfide content of the chemicals is low or if the chemicals are pre-treated to remove sulfide. The purified pulping chemicals can then be returned to the Kraft process. In the context of the present invention, references to "removal" of sulfide include conversion of the sulfur to another species.

More specifically, the invention provides an improvement in a Kraft pulping process in which pulping chemicals are used to treat cellulosic fibrous feed material to form pulp in a process loop in which the fibrous feed material is heated with a white liquor in a digestion stage, to produce fibrous pulp and a black liquor, and in which the black liquor is treated in the recovery cycle which includes the steps of concentrating the black liquor, burning the concentrated black liquor in a recovery boiler to yield a smelt, treating the smelt to form a said white liquor, and returning the white liquor to the digestion stage. The improvement comprises the further steps of: collecting pulping chemicals from the process loop for treatment, at a point in the loop which is selected so that (a) the sulfide content of the chemicals is low, or (b) the chemicals can be pre-treated to remove sulfide, and in case (b), effecting such pre-treatment; subsequently treating the collected pulping chemicals to remove sodium chloride in an ion exchange unit containing an amphoteric ion exchange resin; and returning the treated pulping chemicals to the process.

A corresponding apparatus for performing the process is also provided.

The ion exchange unit used in the process of the invention contains an amphoteric ion exchange resin. This type of ion exchange resin is also called a 'snake-cage polyelectrolyte', and was first reported by Hatch ("Preparation and Use of Snake-Cage Polyelectrolytes": Industrial and Engineering Chemistry Vol. 49 No. Nov. 11, 1957). Although several different types of amphoteric resins can be employed, the preferred type is one in which acrylic acid is polymerized inside a quaternary amine strong base anion exchange resin, as described by Hatch in U.S. Pat. No. 3,041,292. The Hatch ion exchange process is sometimes referred to as "ion retardation".

Resins of the type described by Hatch may be defined as a granular amphoteric ion exchange agent, individual granules of which are each an insoluble composite body of at least two intimately associated solid resin ingredients, including an insoluble cross-linked resin, one of which resin ingredients contains cation exchanging groups and another of which resin ingredients contains anion exchanging groups. A more specific definition is a bead form of polystyrene cross-linked with divinylbenzene and having nuclear substituted quaternary trialkyl ammonium groups, wherein said quaternary ammonium groups are neutralized by carboxylic acid groups which are pendant on chains of polyacrylic acid entrapped within the resin beads (see U.S. Pat. Nos. 3,076,140 and 4,235,717, as well as Dorfner "Ion Exchangers"—Walter de Gruyter Berlin, New York, 1991).

Although amphoteric ion exchange resins traditionally are used in particulate form, an amphoteric ion exchange resin may be made in the form of a membrane for use in a diffusion dialysis process very similar to that used to separate acids from salts. Water is used to strip sodium chloride from the membrane. The diffusion dialysis process using an amphoteric ion exchange resin in membrane form is essentially the same process as ion retardation in a fixed bed.

It has been recognized in the literature that 'ion retardation' which employs amphoteric snake-cage polyelectrolyte ion exchange resins, can be used to separate sodium chloride from sodium hydroxide or sodium sulfate. The present inventors have unexpectedly found that these resins also have a high selectivity for sodium sulfide and that, in a Kraft process, the resins will remove sodium sulfide, in addition to sodium chloride, from white or green liquors. The sulfide contained in the liquor undergoing treatment would then be lost. Normally sodium sulfide is a valued, desired component in kraft pulping liquors and it would not be acceptable to lose sodium sulfide along with sodium chloride, unless there is a surplus of sulfur in the kraft cycle which needs to be removed. It would therefore be disadvantageous to employ the ion retardation process to remove chloride from kraft liquors under normal circumstances.

In the Kraft process, the strong black liquor is burned in a recovery boiler. Because of the relatively high volatility of the sodium chloride contained in the strong black liquor, a considerable quantity of sodium chloride is found in dust collected by the electrostatic precipitator (ESP dust). Most of the sulfur contained in the black liquor is initially present as sulfate, but is reduced to sulfide in the bottom of the boiler in the char bed. This material passes into the smelt. Any sulfur that escapes into the combustion gas, is oxidized to sulfate, producing sodium sulfate according to the following reaction:

$$Na_2O + H_2S + 2O_2 \rightarrow Na_2SO_4 + H_2O$$

The sodium sulfate is collected as dust in the electrostatic precipitator. Consequently, the ESP dust contains a high concentration of sodium chloride, along with sodium sulfate, but virtually no sodium sulfide. In accordance with a first aspect of the invention, this ESP dust is dissolved in water and fed to the ion exchange unit. The purified sodium sulfate solution produced by the ion exchange unit is next mixed with black liquor and fed back to the recovery boiler, where most of the sulfate is converted back to sulfide. The sodium chloride eluted from the ion exchanger is wasted. Thus, chloride contamination is removed from the kraft recovery cycle with very little loss of sulfur.

More specifically, the improvement provided by this aspect of the invention involves collecting dust from exhaust gases produced in the recovery boiler; dissolving the dust collected from the exhaust gases in water to produce a solution containing sodium chloride and sodium sulfate; filtering the solution to produce a filtrate solution and a solid product; feeding the filtrate solution to an ion exchange unit selected to remove sodium chloride and produce a purified sodium sulfate product; removing said sodium chloride from the ion exchange unit by water elution; and recycling at least one of said products to said recovery cycle.

This aspect of the invention is based on the recognition that dust in the exhaust gases from the Kraft recovery boiler is enriched in chloride and potassium and that at least the chloride can be removed by the process steps of the inventive improvement, leaving a valuable product that can be returned to the recovery cycle of the Kraft process.

In one embodiment of this aspect of the present invention, the dust from the kraft recovery boiler is dissolved in water to the greatest extent possible. The resulting solution still contains a significant amount of suspended material, for example oxides of non-process elements such as calcium, manganese, iron and zinc. These insolubles are first filtered out using a conventional solid liquid separation device such as leaf or drum filter. The filtered liquor, which now contains only trace levels of these non-process elements, is then passed through a bed of an ion exchange resin which has the ability to sorb sodium chloride while excluding other salts such as sodium sulfate and sodium carbonate. This chloride-depleted sodium sulfate/carbonate solution is then recycled back to the Kraft pulping process.

Unlike the Earl process, an additional evaporator is not required specifically to operate this process. The water that is used to dissolve the dust does of course represent an additional load on the evaporators that typically are used to concentrate the black liquor, so in principle there is no reduction in energy consumption. In practice, however there may be a significant saving. The black liquor evaporators often have extra capacity, in which case there will be no additional capital cost. In any case, the black liquor evaporators are typically multiple effect units, which reduces the energy required to accomplish a given amount of evaporation by typically 70% compared to single effect evaporation.

An additional benefit of this aspect of the present invention is that, unlike both the recrystallization and leaching prior art processes, it is not necessary to neutralize the carbonate salt with sulfuric acid to convert it to sodium sulfate.

The chloride that has been taken up by the ion exchange resin is desorbed with water to yield a sodium chloride solution containing only very low levels of sodium sulfate. This stream can then be purged from the system.

In this embodiment of the invention, a portion of the potassium ions will follow the sodium sulfate rich stream and a portion will follow the sodium chloride rich stream. Unlike the selectivity that the ion exchange resin shows for chloride, it shows very little, if any selectivity for potassium. The mole fraction of potassium in each stream remains the same as that in the original dust itself. Thus, while this embodiment is highly efficient in chloride removal, it has very limited capacity for potassium removal.

This invention may also be used in conjunction with the recrystallization process described above. In the recrystallization process, the mother liquor which has been separated from the sodium sulfate crystals is normally purged from the system. This stream does however contain a significant quantity of valuable sodium sulfate. This stream can be treated with an ion exchange unit employing amphoteric ion exchange resin to remove the chloride from this stream. The chloride depleted/sulfate rich stream can then be recycled back to the kraft pulping process while the chloride eluate is purged.

In another embodiment of the invention, the precipitator dust is leached with a reduced amount of water. Chloride is preferentially dissolved from the dust, producing a solution which is saturated in chloride salt. The amount of sodium sulfate dissolved from the dust is limited, because its solubility is reduced by the high concentration of sodium chloride, owing to the common ion effect. The slurry is then fed to a solid/liquid separation device such as a rotary drum vacuum filter. The solids, which are depleted in chloride are recycled to the Kraft pulping process, while the filtrate is then passed through a bed of amphoteric ion exchange resin which has the ability to sorb sodium chloride while excluding other salts such as sodium sulfate. The chloride-depleted sodium sulfate solution is then recycled to the Kraft pulping process. The chloride that has been taken up by the ion exchange resin is desorbed with water to yield a sodium chloride solution containing only very low levels of sodium sulfate which can be purged from the system.

A major advantage of this embodiment of the invention over the prior art leaching process such as that of Moy is that it is not necessary to minimize the concentration of sodium sulfate in the leachate. In the prior art leaching process this leachate, together with its contained sodium sulfate values, is purged to waste along with the chloride impurities. In the present invention the sulfate contained in the leachate is separated from the chloride impurities and recycled back to the Kraft pulping process. In fact, it is possible to improve the efficiency of the leach in removing chloride and potassium by allowing a higher concentration of sulfate in the leachate without increasing the loss of sulfate.

A key feature of this particular embodiment of the invention is its improved potassium removal efficiency over the previously described embodiment. The potassium present in the precipitator dust exists principally as potassium chloride and potassium sulfate. Like sodium chloride the solubility of potassium chloride in the leach liquor is quite high. Unlike sodium sulfate, whose solubility has been depressed by the presence of the high sodium chloride concentration, the solubility of potassium sulfate has not been depressed, since it does not have a common ion with the sodium chloride. As a result, the leachate will be significantly enriched in potassium compared to the dust itself. When the filtrate is fed to the ion exchange unit, the potassium will distribute itself between the chloride rich and sulfate rich streams in the same mole fraction in which it is fed. A significant portion of the potassium will thus find its way out of the system along with the chloride rich stream and be purged from the system.

Unlike the Moy process, with the present invention it is not necessary to neutralize the carbonate content of the dust with sulfuric acid. Any sodium carbonate that is dissolved from the dust is rejected by the amphoteric ion exchange resin and is recycled back to the Kraft pulping process along with the sulfate.

If the chloride depleted/sulfate rich stream from the ion exchange unit is recycled directly back to the Kraft pulping process, a significant amount of the potassium dissolved from the dust will also be recycled. In a preferred embodiment, the purified sulfate rich salt stream from the ion exchange unit is recycled back to the leach step instead of being returned directly to the Kraft pulping process. As a result, the leachate will be further enriched in potassium. In fact, in principle, the only way that potassium can leave the system is with the chloride eluate stream from the ion exchange unit. Providing that the solubility of potassium salt is not exceeded in the leach liquor, potassium will build up in the leach liquor until the removal rate of potassium by the ion exchange unit equals the feed rate of potassium contained in the precipitator dust fed to the system.

In practice, some chloride and potassium will remain in the solids collected from the filter. However this can be further minimized by utilizing a small portion of the sulfate rich stream from the ion exchange unit to wash the dewatered solids before they are harvested from the filter.

As with the embodiments described above, with this preferred embodiment it is not necessary to neutralize the carbonate salts with sulfuric acid to convert them to sodium sulfate. Because the amphoteric ion exchange resin takes up very little carbonate, it will build up in the leach liquor until the solubility of sodium carbonate, or possibly burkeite, a double salt of $Na_2SO_4$—$Na_2CO_3$, is exceeded. The presence of high concentrations of sodium chloride and sodium sulfate will tend to reduce the solubility of sodium carbonate, owing to the common ion effect. As a result, carbonate will tend to follow the sodium sulfate and be retained in the filter cake and ultimately recycled back to the Kraft pulping process.

The volume of liquid requiring ion exchange treatment with this embodiment is appreciably reduced compared to the embodiment in which the dust is completely dissolved. This reduces the size and cost of the associated ion exchange equipment and represents another significant advantage for this embodiment.

In Kraft process plants in which chloride contamination is high, such as at coastal mills or when mill closure is practised to a high degree, the extent of chloride removal afforded by treatment of ESP dust may not suffice. In such instances, chloride removal must be augmented in some way, to avoid build-up to unacceptable levels in the kraft liquor.

In accordance with a second aspect of the invention, chloride is removed directly from the Kraft liquors. The best choice is the white liquor since this is the cleanest kraft liquor available, although green liquor could also be treated. It is first necessary to remove the sulfide from the white liquor. This can be accomplished by oxidizing the white liquor by oxygen in a boiler as is done with black liquor in a recovery boiler. The oxidation can be also accomplished by air or oxygen under less strenuous conditions according to various techniques already known to those skilled in the art. One such process is the OXYPRO™ process from Air Products & Chemicals. Although the oxidation of white liquor occurs in stages according to a number of chemical reactions, it can be expressed in simplified form by the following reaction, which is similar to that occurring in the recovery boiler described above:

After the sodium sulfide is oxidized to sodium sulfate, the oxidized white liquor, which contains sodium hydroxide, sodium carbonate, sodium sulfate and sodium chloride, can be processed by the ion exchanger, which removes the sodium chloride. To avoid fouling the ion exchange unit with suspended material, it is advisable to filter the oxidized white liquor prior to ion exchange treatment. The purified, oxidized white liquor can be mixed with the black liquor and fed to the recovery boiler where most of the sulfate is converted back to sulfide. The odium chloride recovered from the ion exchanger is discharged as waste.

In a conventional Kraft process, residual lignin still contained in the pulp after digestion of the wood with white liquor, is removed in a subsequent delignification stage prior to bleaching. In order to reduce the quantity of chloride impurities entering the recovery cycle, many mills are converting to oxygen delignification from older chlorine delignification technology as part of their mill closure program. Considerable quantities of sodium hydroxide are consumed in the oxygen delignification process to maintain optimum pH and assist in solubilization. If virgin sodium hydroxide is employed and the effluent from the oxygen delignification stage is recycled to kraft recovery, a sodium excess will result. To avoid this, it is common to employ oxidized white liquor as a source of sodium hydroxide.

According to a preferred embodiment of this invention, white liquor is first oxidized to convert the sulfide to sulfate. It is then purified of chloride impurities by the ion exchange unit. After removal of chloride impurities, the purified, oxidized white liquor is then utilized in the oxygen delignification process. The effluent from the oxygen delignification process is then recycled back to the recovery cycle. In this way the sodium hydroxide and sulfur values contained in the white liquor are retained while significant quantities of chloride contamination can be removed. There are no incremental costs associated with the white liquor oxidation since it is required anyway to produce oxidized white liquor for the oxygen delignification process.

Sodium hydroxide is used in a number of other mill processes such as oxidative extraction, peroxide bleaching and gas scrubbing. In many of these applications, oxidized white liquor could be advantageously substituted for virgin sodium hydroxide and the resulting effluents from these processes may be recycled to recovery as part of a mill closure program. In such cases, chloride contamination could be removed by treating the oxidized white liquor with the ion exchange system as described above with oxygen delignification, prior to utilization of the oxidized white liquor and subsequent recycle to recovery.

BRIEF DESCRIPTION OF DRAWINGS

In order that the invention may be more clearly understood, reference will now be made to the accompanying drawings which illustrate a number of preferred embodiments of the invention, and in which.

DESCRIPTION OF PREFERRED EMBODIMENTS

In each of the drawings, the principal steps in a conventional Kraft pulping process are shown in block diagram form, in conjunction with symbols representing further steps in the improvement provided by the invention. Like reference numerals have been used to denote like parts in all figures.

Figure 1:
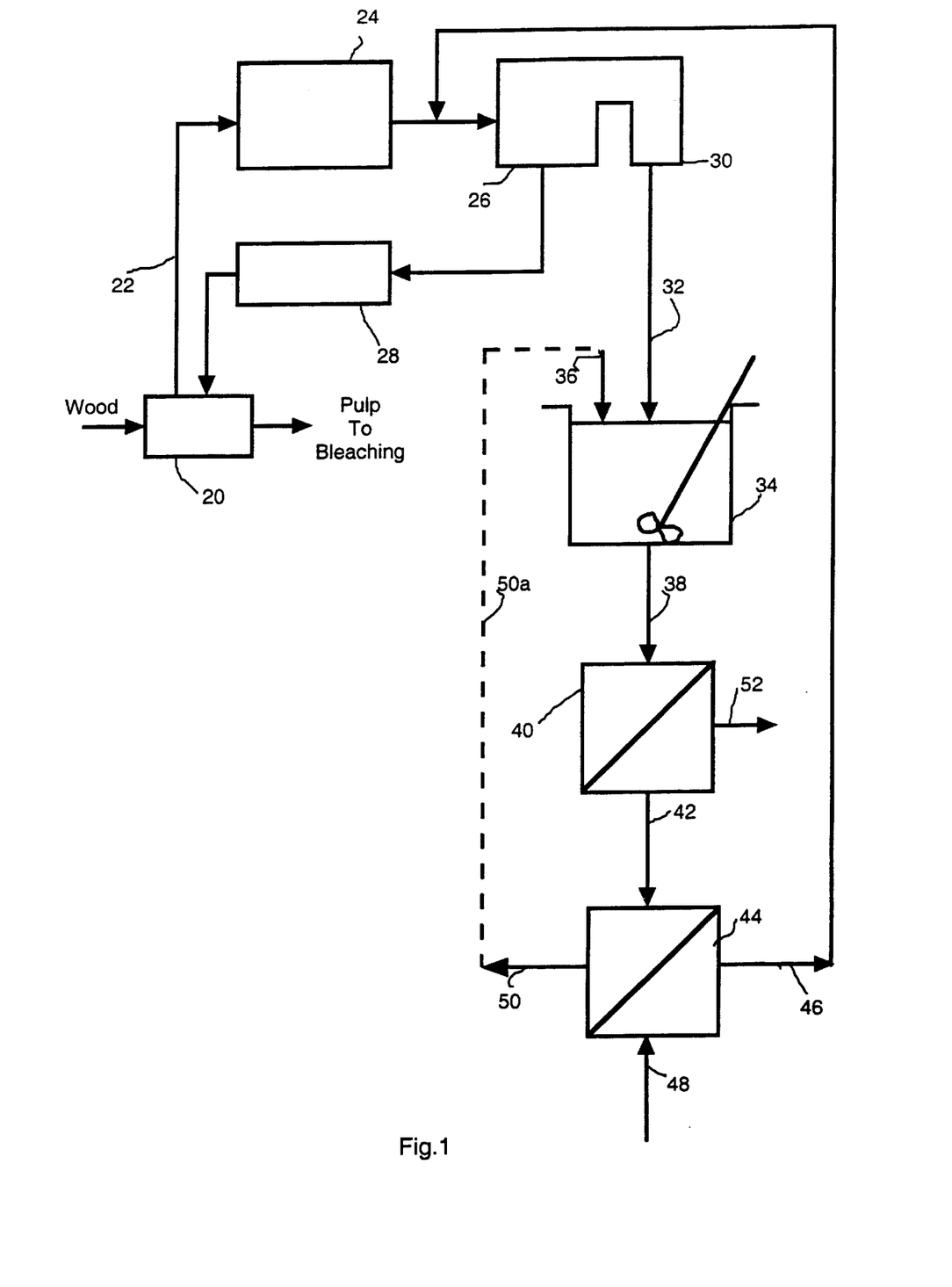
FIGS. 1 to 6 are each block diagrams illustrating three embodiments of the process and apparatus provided by the invention.

Reference will first be made to FIG. 1 by way of example, in briefly describing the overall Kraft process. The process is well known and has been described in some detail earlier; the detailed description therefore will not be repeated here. For present purposes, it is sufficient to note that pulping chemicals are used to treat cellulosic fibrous feed material (wood) to form pulp, in a process loop in which the feed material is heated in a digestion stage represented at 20 with a "white liquor" to produce a digested fibrous pulp that is then sent to a bleaching stage. The black liquor is treated in a recovery cycle generally indicated at 22 including an evaporation stage 24 in which the black liquor is concentrated, and a stage indicated at 26 in which the concentrated black liquor is burnt in a boiler to yield a smelt. As discussed previously, the smelt is quenched with water to form a raw "green liquor" which is then clarified. The clarified green liquor is causticized with lime to convert the sodium carbonate present in the liquor to sodium hydroxide. The causticized green liquor is filtered to produce the white liquor which is used in the digestion stage. These steps are represented generally at 28 in FIGS. 1, 2 and 3. Reference numeral 30 indicates an electrostatic precipitator on the boiler exhaust, by which dust is collected from the flue gases (ESP dust). In the drawings, the dust delivered from the electrostatic precipitator 30 is indicated by the arrow 32. The dust contains sodium sulfate and has been enriched in chloride and potassium contamination relative to the Kraft pulping liquors.

In the most basic embodiment of the first aspect of the invention shown in FIG. 1, the dust is fed to a dissolving tank 34. Water 36 is added to dissolve the dust. The resulting salt solution is fed via line 38 to a filter 40 (e.g. a leaf or drum filter). The filtrate 42 is then fed to an ion exchange unit 44 equipped with an amphoteric ion exchange resin. The ion exchange resin takes up the chloride contamination, leaving a purified sodium sulfate solution 46 which is recycled back to the Kraft pulping process. Water 48 is employed to elute the chloride from the ion exchange resin, thereby producing a sodium chloride eluate solution 50 which is normally purged as waste.

In this embodiment, solid material 52 removed by filter 40 comprises primarily metal oxide impurities and is also discarded as a waste product.

A disadvantage of the embodiment of FIG. 1 is that the rather low concentration of chloride in the dust will result in a low concentration of chloride in the solution fed to the ion exchange unit. Consequently, a rather large volume of dilute eluate waste solution is produced as shown in Table II (see examples). In addition, a rather large quantity of water is required to effect elution of the chloride from the resin. It would be desirable to reduce water consumption. Furthermore if reuse of the sodium chloride were contemplated, for example as feedstock for sodium chlorate production, a more concentrated solution would be preferred.

In a preferred embodiment, a portion of the eluate 50 containing chloride is substituted for fresh water 36 to dissolve the ESP dust 32 in tank 34 instead of being discharged to waste—as indicated by line 50a in FIG. 1. This will increase the concentration of chloride in the solution fed to the ion exchange unit and subsequently increase the concentration of chloride in the portion of the eluate that is discharged to waste. For example, if 50% of the total eluate produced by the ion exchange unit is discharged to waste and the remainder is recycled to the dissolution tank, the concentration of chloride in the feed solution will increased by a two-fold factor. The operating conditions of the ion exchange would be adjusted to deal with the higher concentration of chloride in the feed. The volume of eluate discharged to waste could be further reduced by recycling a larger proportion of the eluate to the dissolution tank and reducing the amount of fresh water used for dust dissolution by a corresponding amount.

One negative consequence of increasing the concentration of sodium chloride in the solution is that the solubility of the sodium sulfate will be reduced owing to the common ion effect. Nevertheless, because the amount of chloride in the dust is low relative to the amount of sodium sulfate, the volume of waste chloride can be reduced by substantial amount while the solubility of sodium sulfate would only be reduced by a relatively small amount. For example, if 75% of the eluate shown in example 1 was employed for dust dissolution in place of fresh water, the level of chloride would be increased from about 8 g/L to about 32 g/L, a 400% increase. The solubility of sodium sulfate would be reduced by somewhat less than this amount. Since the solubility of pure sodium sulfate is in excess of 400 g/L, the reduction in solubility would less than $32/400 \times 100\% = 8\%$.

As discussed above, the ion exchange resin shows no preference for potassium ions over sodium. As a result this most basic embodiment (FIG. 1) is not very effective in removing potassium contamination.

Figure 2:
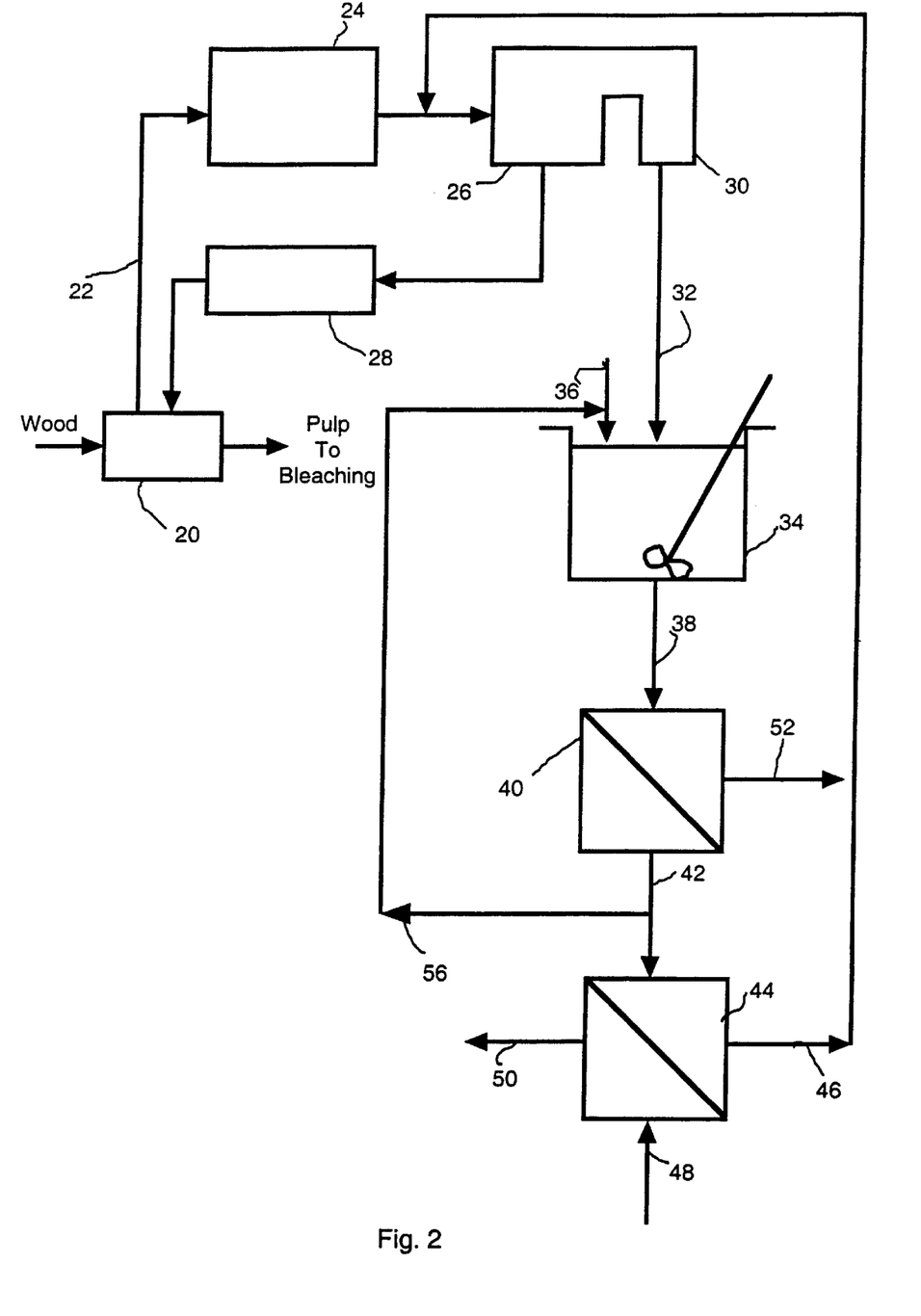

In a modification of the FIG. 1 embodiment illustrated in FIG. 2, only a portion of the dust is dissolved in dissolving tank 34. The amount of fresh water employed is reduced, so that sodium chloride is dissolved, but very little additional sodium sulfate is dissolved. The remaining dust which is primarily sodium sulfate is separated from the liquid by a suitable filter 40. In this embodiment, a rotary drum vacuum filter is preferred. The solid sodium sulfate product 52 collected from the filter 40 contains a reduced concentration of chloride is recycled back to the Kraft process. The filtrate 42 contains a high concentration of sodium chloride as well as some sodium sulfate and is then fed to the ion exchange unit 44 (also containing an amphoteric ion exchange resin). The ion exchange resin removes the chloride leaving a purified sodium sulfate solution 46 which is recycled to the Kraft recovery cycle 22.

If the dust contains relatively low levels of chloride, the amount of liquid processed by the ion exchange unit in relation to the amount of dust processed will be rather small. In this case the slurry solids concentration would tend to become rather high and therefore difficult to handle. To deal with this situation, a portion of the filtrate can be recycled directly back to the dissolving tank via line 56 to reduce the solids concentration of the slurry.

Figure 3:
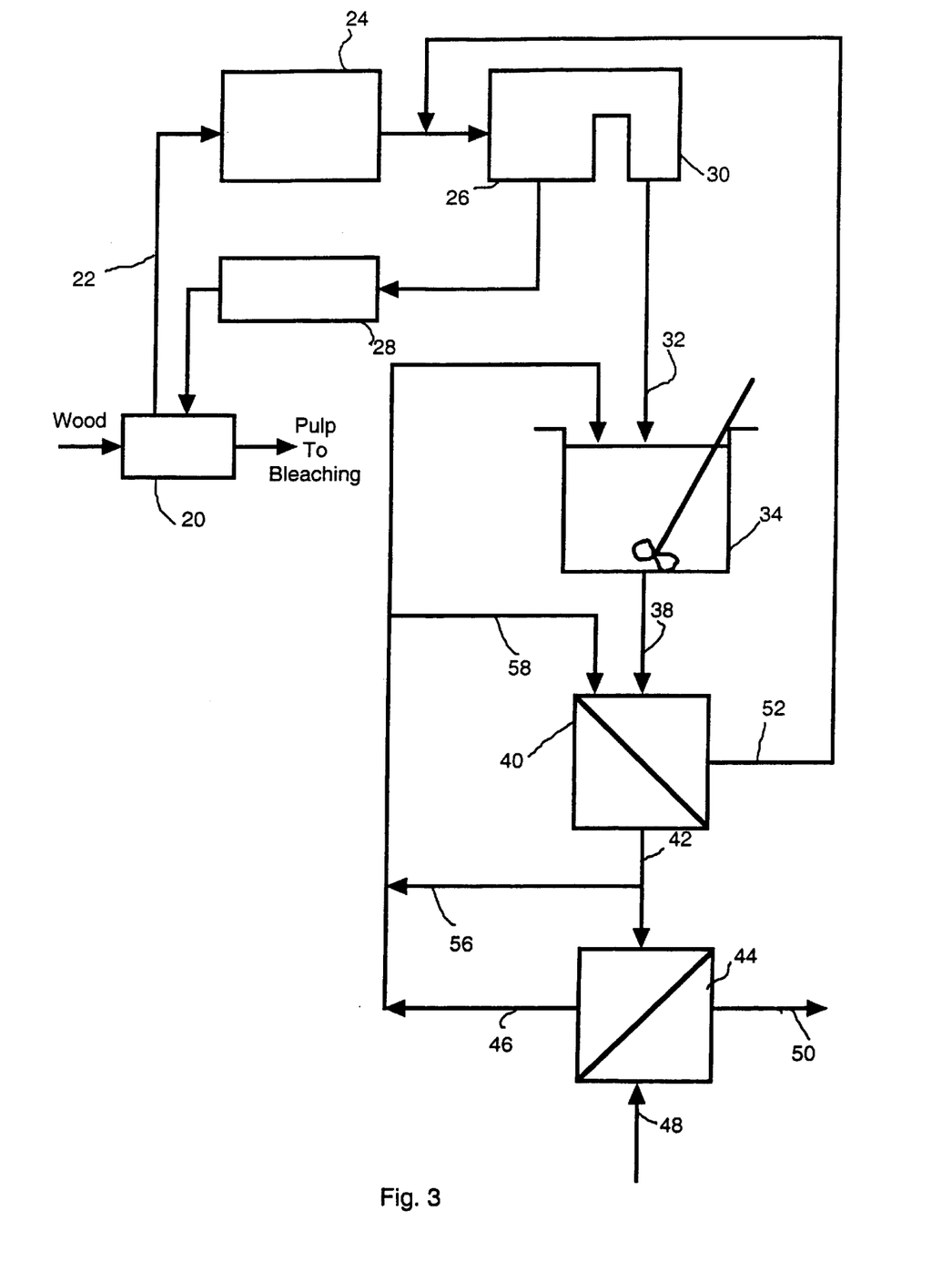

In a preferred embodiment shown in FIG. 3, the purified (i.e. chloride depleted) sodium sulfate solution 46 produced by the ion exchange unit is recycled back to the dissolving tank 34 for leaching the dust to replace all or a portion of the fresh water. By this means, the potassium concentration will build up in the leach solution and therefore the concentration of potassium in the chloride eluate solution will also be increased. As a result, the effectiveness of the system for potassium removal will be enhanced. As with the above embodiment, it may be advantageous to recycle a portion of the filtrate via line 56 to the dissolving tank, to reduce the solids concentration of the slurry. To lower the chloride content of the leached dust, a small portion of purified sodium sulfate solution from the ion exchange unit can be recycled to the filter via line 58 to wash the solids before they are harvested.

Figure 4:
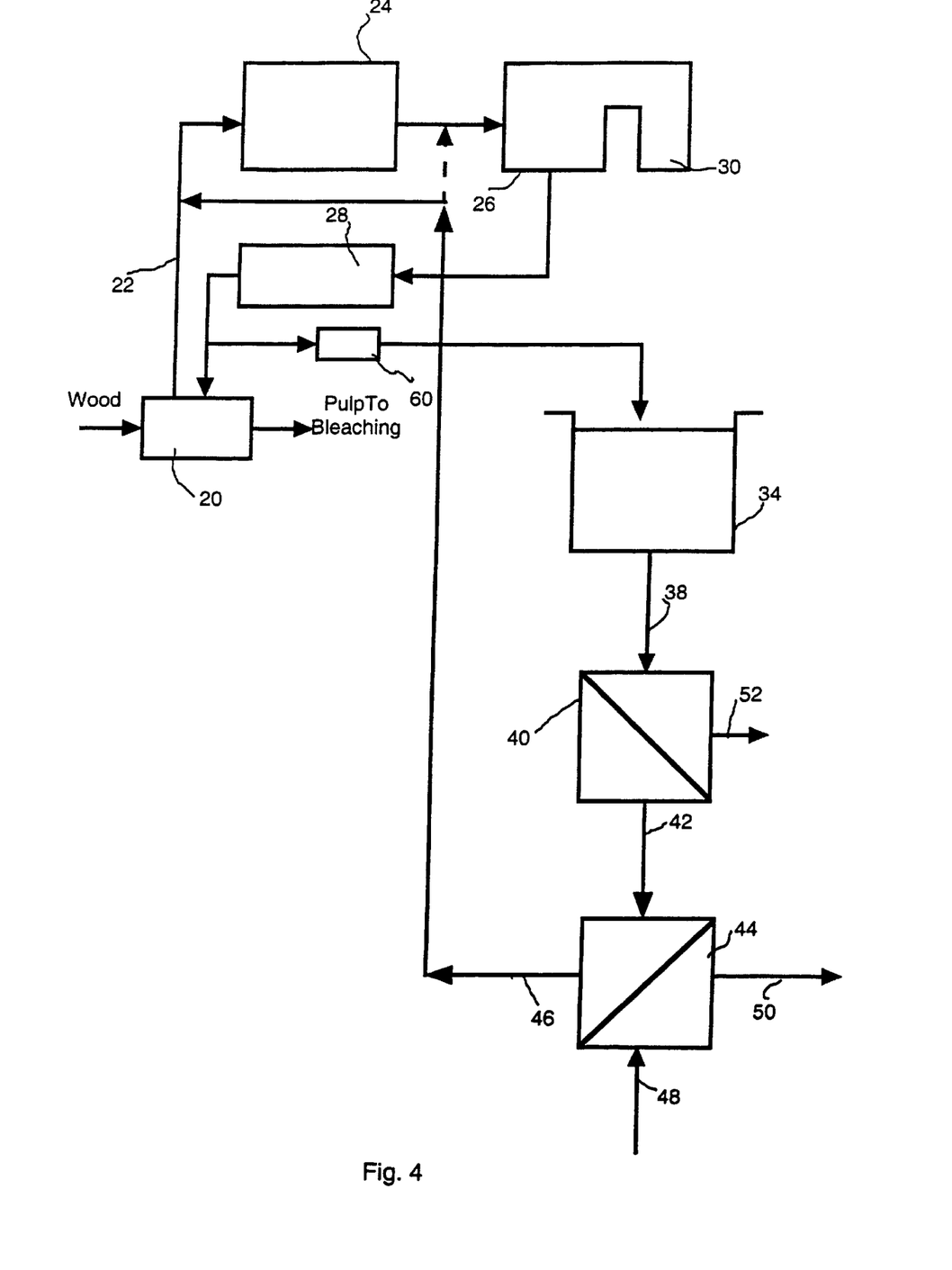
Figure 5:
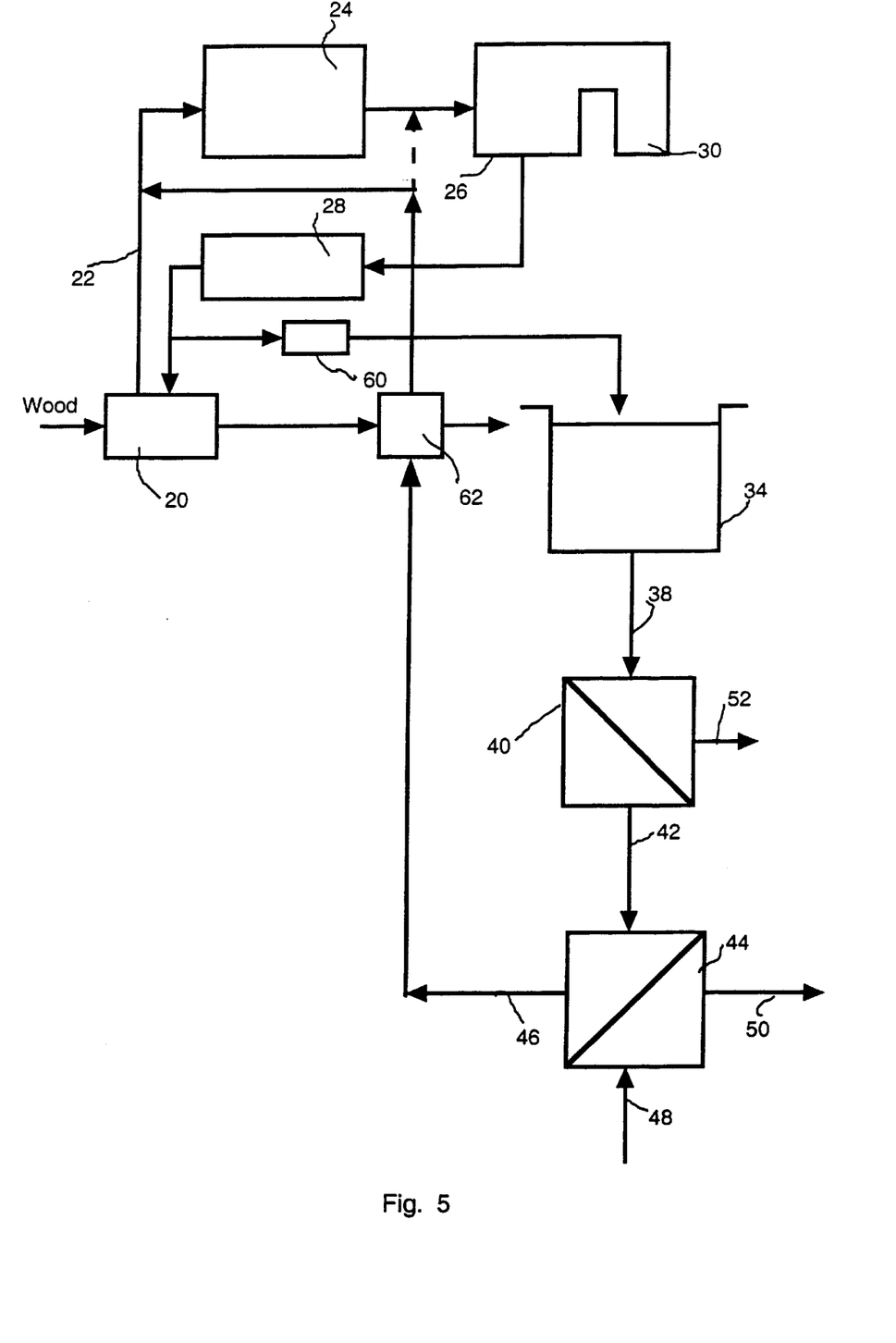

FIGS. 4 and 5 illustrate a second aspect of the invention, in which chloride contamination is removed directly from the Kraft pulping liquors.

Referring to FIG. 4, Kraft liquor is collected following process stage 28 and in advance of the digestion stage 20 and is delivered to a white liquor oxidation stage indicated at 60. As discussed previously, sodium sulfide in the liquor is oxidized. The oxidized white liquor is then fed to tank 34, followed by filter 40 and ion exchanger 44 as discussed in connection with previous embodiments. The ion exchange resin in unit 44 removes chloride, leaving a purified white liquor which is recycled back to the Kraft process. Preferably, the solution is returned upstream of evaporation stage 24, although other locations are possible, as indicated by the broken line in FIG. 4. In the other embodiments, alternative locations for returning the recycled solutions also are possible. Reverting to FIG. 4, the recycled solution is mixed with the black liquor prior to being fed to the recovery boiler 26. In the boiler, most of the sulfate in the incoming stream 46 is converted back to sulfide.

It should also be noted that, in the embodiments of FIGS. 4 and 5, tank 34 is optional. In some cases, the solution may be fed directly to filter 40. It should also be noted that treatment of white liquor may be used to supplement removal of chloride from ESP dust. In this case the tank 34 would still be necessary to dissolve the ESP dust. The oxidized white liquor could entirely or partially replace the water that is employed to dissolve the ESP dust.

FIG. 5 shows a further embodiment, in which white liquor is again subjected to white liquor oxidation in stage 60 before being fed to the ion exchange unit. In this embodiment, however, the process also includes an oxygen delignification stage indicated at 62. In this embodiment, the oxidized white liquor, after removal of chloride impurities by the ion exchange unit 44, is fed to the oxygen delignification stage 62, providing sodium hydroxide for the oxygen delignification process. The effluent from the oxygen delignification process is then recycled back to the Kraft process loop for reconversion of the sulfate values to sulfide as discussed previously in connection with FIG. 4. In this way, the sodium hydroxide and sulfur values contained in the oxidized white liquor are retained, while significant quantities of chloride contamination are removed by the ion exchange unit 44.

It is also possible to employ this invention to remove chloride from bleach filtrates prior to recycle to the kraft recovery cycle. Bleach filtrates contain a high concentration of dissolved organic material which if discharged to the environment causes pollution. In addition to the organic pollutants, bleach filtrates contain a significant quantity of valuable inorganic chemicals such as sodium and sulfur compounds. Theses bleach filtrates also contain appreciable quantities of chloride, some of which originates from the kraft cycle and some of which originates from bleaching chemicals. These inorganic compounds are withdrawn from the kraft recovery cycle and enter the bleaching operation along with the pulp fibres. The bleach filtrates do not contain any sulfide, however, since oxidants such as chlorine dioxide employed in the bleaching process would oxidize any sulfide to sulfate. They can therefore be purified of chloride contamination utilizing amphoteric ion exchange resin according to this invention prior to recycle to the kraft recovery cycle, without losing significant sulfur values. In order to reduce the load on the black liquor evaporators, it may be desirable to pre-concentrate the bleach filtrates by suitable means such as an evaporator. This pre-concentration step should be done prior to ion exchange treatment to reduce the flow to be treated by the ion exchanger. Furthermore, the ion exchanger it has been found that the ion exchange unit of this invention performs more efficiently on a pre-concentrated solution.

Figure 6:
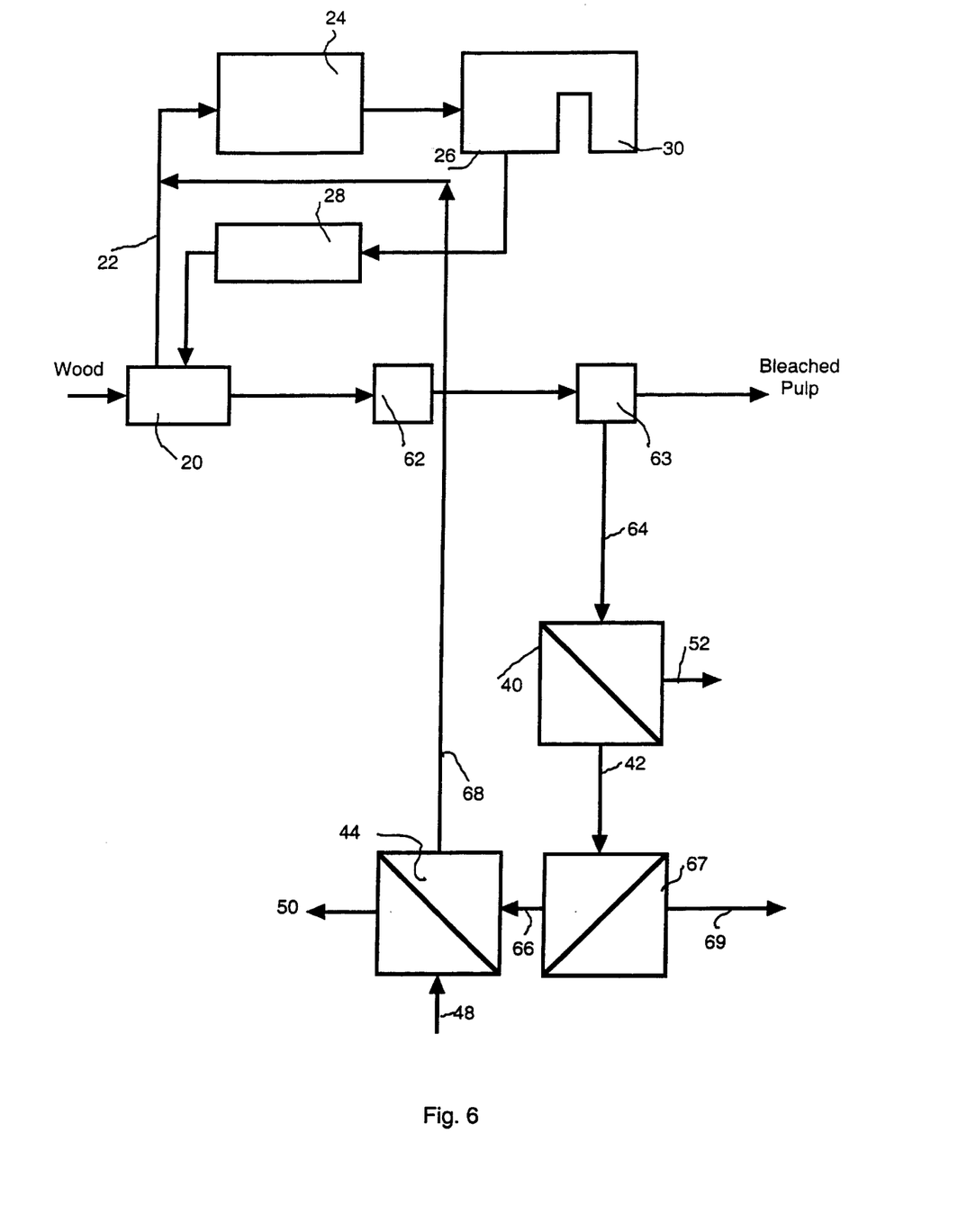

In this embodiment shown in FIG. 6 a conventional bleach plant is indicated at 63 downstream of the oxygen delignification stage 62 (FIG. 5). Bleach filtrates 64, which are collected from some point in the bleach plant 63, such as after what is known as the "D100" bleach stage, are first filtered with a suitable filter such as the filter 40 referred to in previous embodiments to remove suspended material such as fibres to produce a clarified solution 42, which is fed to a concentration device such as an evaporator unit 67. The condensed distillate from the evaporator 69 can be discharged to waste or reused in the mill. The concentrated bleach filtrate 66 is then fed to an ion exchange unit 44 containing an amphoteric ion exchange resin which removes the alkali chloride salt as described previously. Purified, concentrated bleach filtrate 68 can then be recycled to the kraft recovery cycle 22 as with previous embodiments. By doing this the organic pollutants are returned to the kraft recovery cycle where they are burned in the recovery boiler, the valuable inorganic chemicals such as sodium and sulfur are recovered, but the chloride is not recycled.

The embodiment of FIG. 6 can be used in conjunction with or separately from other embodiments of the invention.

EXAMPLES

Example 1

A sample of ESP dust was obtained from an inland mill. A chemical analysis obtained by x-ray fluorescence is shown in Table I. The dust was dissolved in hot water. It was noted that the liquid contained an appreciable quantity of suspended material. The solution was then filtered using Whatman 44 filter paper under vacuum in a Buchner funnel. The filtered solution was fed to the bottom of an ion exchange column containing a bed of amphoteric ion exchange resin measuring 2 inches in diameter by 24 inches in height. The amphoteric ion exchange resin was prepared by polymerizing acrylic acid inside a quaternary amine strong base anion exchange resin according to the method outlined by Hatch in U.S. Pat. No. 3,041,292. After the void of water was displaced from the resin bed, the chloride depleted purified salt solution was collected. Next, water was fed to the top of the ion exchange resin bed. After displacing the entrained void of feed solution from the bed, the eluate was collected from the bed. The average flow rate of solution passed through the bed was approximately 0.4 L/min. The cycle was repeated several times and composite samples of the purified salt and eluate streams were collected and analyzed from one cycle. These results are shown in Table II.

Table I shows that the total concentration of the major non-process elements (Ca, Mn, Fe, Zn) in the dust is 0.184%. When the concentration of these elements in the filtrate which was fed to the ion exchange unit is adjusted for dilution it can be calculated that more than 99% of these elements have been removed by filtration.

Approximately 97% of the chloride contamination was removed from the sulfate solution by the ion exchange unit, while only 7.8% of the sulfate values were lost to the chloride eluate stream. The system was very effective in removing chloride contamination from the sulfate. On the other hand, very little of the potassium contamination was removed from the sulfate, the ratio of potassium to sulfate in the purified salt being the same as that in the feed (0.1).

Although the concentration of the non-process elements in the eluate is near to the detection limits of the analysis (approximately 0.1 mg/L), it can be seen that only a small portion of these elements are taken up by the ion exchange resin and recovered in the eluate. The majority of the small quantity of non-process elements remaining after filtration are found in the purified salt solution.

TABLE I

Typical Inland Mill ESP Dust Analysis

| | |
|---|---|
| Na | 26.3% |
| K | 3.18% |
| Ca | 0.05% |
| Mn | 0.0273% |
| Fe | 0.1% |
| Zn | 0.0068% |

TABLE II

| | volume (L) | [Na] (g/L) | [K] (g/L) | [SO$_4$] (g/L) | [Cl] (g/L) |
|---|---|---|---|---|---|
| feed | 1.105 | 92 | 9.66 | 156 | 8.14 |
| eluate | 1.10 | 12.1 | 1.24 | 12.2 | 8.33 |
| purified salt | 1.11 | 77.7 | 8.55 | 146 | 0.23 |

| | [Ca] (mg/L) | [Mn] (mg/L) | [Fe] (mg/L) | [Zn] (mg/L) |
|---|---|---|---|---|
| feed | 3.5 | 0.2 | 1.7 | 0.18 |
| eluate | 0.3 | 0.1 | 0.4 | <0.1 |
| purified salt | 3.4 | 0.1 | 1.4 | 0.2 |

Example 2

A solution of sodium sulfate and sodium chloride was prepared to simulate a solution obtained from leaching precipitator dust with a sodium sulfate according to the process described by Moy. In this solution the sodium chloride concentration approaches saturation while the concentration of sodium sulfate approaches saturation at that level of sodium chloride. The concentration ratio of sodium chloride to sodium sulfate is approximately 3:1.

The simulated leach solution, which was heated to approximately 60° C., was fed to the bottom of the ion exchange column described in example 1. After the void of water was displaced from the resin bed, the chloride depleted purified salt solution was collected. Next, water at about 60° C. was fed to the top of the ion exchange resin bed. After displacing the entrained void of feed solution from the bed, the eluate was collected from the bed. The average flow rate of solution passed through the bed was approximately 0.34 L/min. The cycle was repeated several times and composite samples of the purified salt and eluate streams were collected and analyzed from one cycle. These results are shown in Table III.

It can be seen from these results that approximately 83% of the chloride contamination was removed from the sulfate solution. This stream would be recycled back to the Kraft pulping process or reused for leaching more dust. Only 6.9% of the sulfate values were lost to the chloride eluate stream which would be discharged to waste.

TABLE III

| | volume (L) | [NaCl] (g/L) | [Na$_2$SO$_4$] (g/L) |
|---|---|---|---|
| feed | 0.31 | 270 | 72 |
| eluate | 0.31 | 223 | 4.9 |
| purified salt | 0.31 | 51.2 | 66 |

Example 3

Synthetic electrostatic precipitator dust typical of a British Columbia coastal mill was prepared by mixing solid sodium sulfate and sodium chloride salts together to contain 25% NaCl. Approximately 3 kg of synthetic dust was mixed with 3 litres of purified salt solution produced by the ion exchange unit from synthetic leach liquor as in example 1. The leaching was conducted over a period of about 2 hours at 60° C. in two equal sized batches. The slurry was filtered under vacuum and the resulting cake was washed with a small amount of water so that the total volume of liquid collected from the filter was 3 litres. The filtrate was held at about 45° C. for two days and a very small amount of solids (est. <10 g) was noted on the bottom of the container, indicating that it was close to saturation as it left the filter. The composition of the initial and final liquids and solids are shown in Table IV. The approximate composition of the final solids was calculated from the material balance.

TABLE IV

| | amount | [NaCl] | [Na$_2$SO$_4$] | g NaCl | g Na$_2$SO$_4$ |
|---|---|---|---|---|---|
| initial liquid | 3 L | 62 g/L | 67.3 g/L | 186 | 202 |
| final liquid | 3 L | 272 g/L | 83.7 g/L | 816 | 251 |
| initial solid | 3 kg | 25% | 75% | 750 | 2250 |
| final solid | | ca 5% | ca. 95% | ca. 120 | ca. 2201 |

Approximately 84% of the sodium chloride was leached from the synthetic dust while only 2% of the sodium sulfate was leached out, neglecting the amount that precipitated in the container after filtration. In the practice of the invention the final liquid obtained from the leach would be fed once again to the ion exchange unit while the final solid would be recycle to the Kraft pulping process.

Example 4

Approximately 2.2 kg of synthetic dust containing 75% sodium sulfate ([SO$_4$]=50.7%), 20% sodium chloride ([Cl]= 14.5%) and 5% potassium chloride ([K]=2.6%) was leached with approximately 2.2 litres of purified sodium sulfate solution produced by the ion exchange unit in example 2 in the manner described in example 3. The remaining solids were filtered and then the filtrate was treated once again with the ion exchange unit as above. This leach/filtration/ion exchange process was repeated ten times employing fresh dust each time, at which point the composition of the leach no longer change appreciably. The purified dust produced from the final leach was analyzed along with the composition of the filtrate solution which was fed to the ion exchange unit as well as the chloride containing eluate and purified salt solutions produced by the ion exchange unit.

Analysis of the final solids collected from the filter indicated that they contained 95.5% of the initial sulfate values, however the potassium content was only 17.9% of initial and the chloride content was only 8.8% of the initial. The composition of the liquids entering and leaving the ion exchange unit during one cycle of the final run are shown in Table V.

TABLE V

|  | volume (L) | [K] (g/L) | [$SO_4$] (g/L) | [Cl] (g/L) |
|---|---|---|---|---|
| feed | 0.299 | 40.2 | 87.0 | 156 |
| eluate | 0.300 | 16.9 | 4.55 | 125 |
| purified salt | 0.313 | 21.5 | 82.6 | 39.8 |

Example 5

White liquor was treated by the ion exchange unit described in Example 1. The results are summarized in the following table:

TABLE VI

|  | volume (L) | [NaOH] (g/L) | [Cl—] (g/L) | [$SO_4$=] (g/L) | [S=] (g/L) |
|---|---|---|---|---|---|
| feed (white liquor) | 0.872 | 84.4 | 3 | 2.77 | 8.47 |
| eluate | 0.867 | 0 | 3.2 | 0.23 | 6.67 |
| purified liquor | 0.872 | 94 | 0.34 | 2.53 | 1.72 |

It can be seen from the data in this table that 78% of the sulfide values in the white liquor fed to the ion exchange unit report to the eluate stream along with the chloride impurities. Little of the sodium hydroxide and sulfate values are taken up by the resin. This illustrates the fact that sulfide values are removed from the pulping chemicals, which would be detrimental if the chemicals were not pre-treated in accordance with the embodiment of FIG. 4 or 5.

Example 6

A synthetic, low sulfidity, oxidized white liquor was prepared by adding equal amounts of $Na_2S$, $Na_2S_2O_3$, $NaSO_4$ and NaCl to NaOH. Sodium sulfide would be converted to sodium thiosulfate ($Na_2S_2O_3$) if the white liquor were only partially oxidized. If the sodium sulfide is entirely converted to sodium sulfate, the white liquor is said to be fully oxidized. This composition was chosen to demonstrate resin selectivity towards various components of the oxidized white liquor. The ion exchange unit used was similar to the one used in Example 1. The oxidized white liquor was filtered and fed to the bottom of the ion exchange bed. After the displacement of the void of water, a purified (ie. chloride-depleted) caustic solution was collected. In the next step, water was fed to the top of the ion exchange resin bed. After displacing the entrained void of feed solution from the bed, the chloride-rich eluate was collected from the bed. The average flow rate of the solution passed through the bed was approximately 0.10 L/min. The composition of oxidized white liquor feed and the experimental results are shown in Table VII. The hydroxide recovery was 92% whereas the chloride and sulfide removal were 99% and 96% respectively. With respect to the other components of oxidized white liquor, the distribution is shown in Table VII. An interesting discovery was that more that 50% of the sodium thiosulphate was sorbed onto the resin and was subsequently eluted with water, ending up in the chloride-rich eluate stream. A further experiment was carried out with a more representative partially oxidized white liquor containing 24 g/L NaCl. The composition of oxidized white liquor feed and the experimental results are shown in Table VIII. The hydroxide recovery was 90% whereas the chloride removal was about 98%. About 41% of $Na_2S_2O_3$ was also recovered in eluate stream along with the chloride. These results indicate that if the white liquor is only partially oxidized, some of the sulfur is lost as $Na_2S_2O_3$, with the chloride, to the eluate stream. In order to minimize loss of sulfur, the sulfide in the white liquor should be fully oxidized to sulphate. In cases where there is an excess of sulfidity in the recovery cycle, it may however be preferable to lose a certain amount of sulfur in this manner.

TABLE VII

Removal of Chloride from Oxidized White Liquor

|  | volume (L) | NaOH (M) | $Na_2S$ (M) | $Na_2CO_3$ (M) | $Na_2S_2O_3$ (M) | $Na_2SO_4$ (M) | NaCl (M) |
|---|---|---|---|---|---|---|---|
| Feed | 0.63 | 2.01 | 0.13 | 0.1 | 0.07 | 0.07 | 0.15 |
| Eluate | 0.63 | 0.15 | 0.13 | 0.0 | 0.04 | 0.01 | 0.15 |
| Purified Caustic | 0.64 | 1.73 | 0.00 | 0.1 | 0.03 | 0.06 | 0.0 |

TABLE VIII

Removal of Chloride from Partially Oxidized White Liquor

|  | volume (L) | NaOH (M) | $Na_2S_2O_3$ (M) | NaCl (M) |
|---|---|---|---|---|
| Feed | 0.64 | 2.72 | 0.34 | 24.05 |
| Eluate | 0.64 | 0.31 | 0.14 | 24.0 |
| Purified Caustic | 0.64 | 2.44 | 0.21 | 0.64 |

Example 7

This example illustrates that alkali metal chloride can be removed from a chlorine dioxide bleach filtrate. This application is important in the context of system closure, when the bleach plant effluents are recycled back to the recovery cycle and as a result, the level of chloride is increased. A 10 mL volume of chlorine dioxide bleach filtrate (100% $ClO_2$ substitution) at a pH of 2.26 and at room temperature, with a sodium chloride content of 0.21 g/L and $ClO_2$ content of 4.3 ppm was fed to the top of an ion exchange resin bed 1 cm in diameter and 20 cm in height, containing amphoteric ion exchange resin similar to that of example 1. After the displacement of the void of water, a purified (i.e. chloride-depleted) bleach filtrate solution was collected. In the next step, 10 mL of water was fed to the top of the ion exchange resin bed. After displacing the entrained void of bleach filtrate feed solution from the bed, the chloride-rich eluate was collected from the bed. The composition of the bleach filtrate feed and the experimental results are shown in Table IX, trial 1. Because of the low pH, a small amount of chloride (0.047 g/L) is in the form of HCl which is not retained by the resin. Since D-stage filtrate is usually mixed with E-stage filtrate at a pulp mill, the filtrate was next neutralized with sodium hydroxide to a pH of 7.2 and then concentrated (by evaporation) to a sodium chloride concentration of 2.78 g/L. A small amount of sodium sulphite was added to destroy the $ClO_2$ residue prior to concentration. Residual fibre and particulates were separated after concentration and the resulting solution was fed to the ion exchange unit. The composition of the effluent and the experimental results are shown in Table IX, trial 2. The chloride removal efficiency is improved as a result of concentrating the effluent and raising the pH. Although concentrating the effluent will be considered an extra cost, the lower volume processed means that a much smaller ion exchange unit will be required and the capital cost is reduced. The discrepancy in mass balance is probably due to the small size and configuration of the column used and the uptake of other salts by the resin. Better separation efficiency and mass balances can be expected if the ion exchange unit of Example 1 is used.

TABLE IX

Removal of Chloride from $D_{100}$ Bleach Filtrate

|  | Trial 1 | | Trial 2 | |
| --- | --- | --- | --- | --- |
|  | NaCl (g/L) | NaCl (%) | NaCl (g/L) | NaCl (%) |
| Feed ($D_{100}$) | 0.203 | 100 | 2.78 | 100 |
| Eluate | 0.128 | 63 | 2.31 | 83 |
| Purified Filtrate | 0.036 | 18 | 0.41 | 14 |

We claim:

1. A Kraft pulping process in which pulping chemicals are used to treat cellulosic fibrous feed material to form pulp, in a process loop in which the fibrous feed material is heated with a white liquor in a digestion stage to produce fibrous pulp and a black liquor, and in which the black liquor is treated in a recovery cycle which includes the steps of concentrating the black liquor, burning the concentrated black liquor in a recovery boiler to yield a smelt, treating the smelt to form a said white liquor and returning the white liquor to the digestion stage;

wherein the improvement comprises the further steps of:

collecting pulping chemicals from the process loop at a point in the loop which is selected so that (a) the sulfide content of the chemicals is low, or (b) the chemicals are pre-treated to remove sulfide;

subsequently treating the collected pulping chemicals to remove sodium chloride in an ion exchange unit containing an amphoteric ion exchange resin; and, returning the treated pulping chemicals to the process loop.

2. A process as claimed in claim 1, wherein the ion exchange resin is a granular amphoteric ion exchange agent, individual granules of which are each an insoluble composite body of at least two intimately associated solid resin ingredients, including an insoluble cross-linked resin, one of which resin ingredients contains cation exchanging groups, and another of which resin ingredients contains anion exchanging groups.

3. A process as claimed in claim 2, wherein the ion exchange resin is a bead form of polystyrene cross-linked with divinylbenzene and having nuclear substituted quaternary trialkyl ammonium groups, wherein said quaternary ammonium groups are neutralized by carboxylic acid groups which are pendant on chains of polyacrylic acid entrapped within the resin beads.

4. A process as claimed in claim 1, wherein said step of collecting pulping chemicals from the process loop comprises collecting dust from exhaust gases produced in the recovery boiler, said dust being low in sulfide content;

wherein the improvement further comprises:

dissolving the dust collected from the exhaust gases in water to produce a solution containing sodium chloride and sodium sulfate;

filtering the solution to produce a filtrate and a solid product;

feeding the filtrate solution to said ion exchange unit for producing a purified sodium sulfate product;

removing said sodium chloride from the ion exchange unit by water elution; and, recycling at least one of said products to said recovery cycle.

5. A process as claimed in claim 4, wherein a portion of the sodium chloride solution obtained by water elution of said ion exchange unit is employed for dissolving said dust.

6. A process as claimed in claim 4, wherein the amount of water used in said dissolving step is controlled so that only a portion of the dust is dissolved, whereby said solid product produced in said filtering step is primarily sodium sulfate, and wherein said sodium sulfate product is recycled to said recovery cycle.

7. A process as claimed in claim 6, wherein said purified sodium sulfate solution produced by the ion exchange unit is also recycled to said recovery cycle.

8. A process as claimed in claim 7, wherein a portion of said filtrate solution from said filtering step is recycled to said dissolving step.

9. A process as claimed in claim 6, comprising the further step of recycling said purified sodium sulfate solution from the ion exchange unit to said dissolving step for dissolving chloride from said dust and producing a slurry.

10. A process as claimed in claim 1, wherein said step of collecting pulping chemicals from the process loop comprises collecting said white liquor prior to delivery of said white liquor to the digestion stage, and pre-treating the white liquor to remove sulfide.

11. A process as claimed in claim 10, wherein said pre-treatment comprises white liquor oxidation.

12. A process as claimed in claim 11, wherein the improvement comprises the further steps of:

feeding the oxidized white liquor to said ion exchange unit for removal of chloride and production of a purified white liquor;

removing sodium chloride from the ion exchange unit by water elution; and, recycling said purified white liquor to said process loop.

13. A process as claimed in claim 12, wherein said fibrous pulp is subjected to an oxygen delignification stage, and wherein said purified sodium sulfate product is delivered to said oxygen delignification stage to provide a source of sodium hydroxide, producing delignified pulp and an effluent, and wherein said effluent is recycled to said process loop.

14. A process as claimed in claim 1, wherein said pulping chemicals comprise a bleach filtrate collected from a bleach plant downstream of said digestion stage, said bleach filtrate subsequently being treated in said ion exchange unit to remove chloride and produce a purified bleach filtrate which is delivered to the process loop.

15. A process as claimed in claim 14, comprising the further step of concentrating the purified bleach filtrate prior to treatment in said ion exchange unit.

16. A method for purifying chemicals used in a Kraft pulping process, comprising the steps of:

collecting pulping chemicals from the process for treatment at a point which is selected so that (a) the sulfide content of the chemicals is low or (b) the chemicals are pre-treated to remove sulfide and; and,     treating the collected pulping chemicals to remove sodium chloride in an ion exchange unit containing a granular amphoteric ion exchange agent, individual granules of which are each an insoluble composite body of at least two intimately associated solid resin ingredients, including an insoluble cross-linked resin, one of which resin ingredients contains cation exchanging groups and another of which resin ingredients contains anion exchanging groups.

17. A Kraft pulping apparatus in which pulping chemicals are used to treat cellulosic fibrous feed material to form pulp, in a process loop, the apparatus comprising means for heating cellulosic fibrous feed material with a white liquor in a digestion stage to product fibrous pulp and a black liquor, and means for treating the black liquor in a recovery cycle to concentrate the black liquor, burn the concentrated black liquor in a recovery boiler to yield a smelt, and form from said smelt a said white liquor to be returned to said digesting means;

wherein the improvement comprises:

means for collecting pulping chemicals from the process loop at a point in the loop which is selected so that (a) the sulfide content of the chemicals is low, or (b) the chemicals are pre-treated to remove sulfide, the improvement then further comprising means for carrying out said pre-treatment;

means for subsequently treating the collected pulping chemicals to remove sodium chloride, comprising an ion exchange unit containing an amphoteric ion exchange resin; and,     means for returning the treated pulping chemicals to the process loop.

18. An apparatus as claimed in claim 17, wherein said collecting means comprises means for collecting dust from exhaust gases produced in the recovery boiler;

said improvement further comprising means for dissolving the dust collected from the exhaust gases in water to produce a solution containing sodium chloride and sodium sulfate;

means for filtering the solution to produce a filtrate solution and a solid product;

means for delivering filtrate solution to said ion exchange unit for removal of sodium chloride and production of a purified sodium sulfate product;

means for eluting sodium chloride from the ion exchange resin with water; and,     means for recycling at least one of said products to said recovery cycle.

19. An apparatus as claimed in claim 18, further comprising means for recycling a portion of said filtrate solution from said filtering means to said dissolving means.

20. An apparatus as claimed in claim 18, further comprising means for recycling said purified sodium sulfate solution from the ion exchange unit to said dissolving means for dissolving chloride from said dust and producing a slurry.

21. An apparatus as claimed in claim 18, further comprising means for recycling said solid product from the filtering means to said recovery cycle.

22. An apparatus as claimed in claim 18, further comprising means for recycling a portion of said filtrate solution from said filtering means to said dissolving means.

23. An apparatus as claimed in 17, wherein said means for collecting pulping chemicals from the process loop comprises means for collecting white liquor prior to delivery of said white liquor to the digestion stage, and means for pre-treating the white liquor to remove sulfide.

24. An apparatus as claimed in claim 23, wherein said pre-treatment means comprises white liquor oxidation means.

25. An apparatus as claimed in claim 24, further comprising:

means for feeding the oxidized white liquor to said ion exchange unit for removal of chloride and production of a purified white liquor;

means for removing sodium chloride from the ion exchange unit by water elution; and,     means for recycling said white liquor product to said process loop.

26. An apparatus as claimed in claim 25, further comprising an oxygen delignification stage, means for delivering said purified sodium sulfate product to said oxygen delignification stage to provide a source of sodium hydroxide, for producing delignified pulp and an effluent, and means for recycling said effluent to said process loop.

27. For use in combination with a Kraft pulping apparatus in which pulping chemicals are used to treat cellulosic fibrous feed material to form pulp, in a process loop, the apparatus comprising means for heating cellulosic fibrous feed material with a white liquor in a digestion stage to product fibrous pulp and a black liquor, and means for treating the black liquor in a recovery cycle to concentrate the black liquor, burn the concentrated black liquor in a recovery boiler to yield a smelt, and form from said smelt a said white liquor to be returned to said digesting means, apparatus for recovering useful pulp and chemicals,     apparatus for purifying said pulping chemicals comprising:

means for collecting pulping chemicals from the process loop at a point in the loop which is selected so that (a) the sulfide content of the chemicals is low, or (b) the chemicals are pre-treated to remove sulfide, the improvement then further comprising means for carrying out said pre-treatment;

means for subsequently treating the collected pulping chemicals to remove sodium chloride, comprising an ion exchange unit containing an amphoteric ion exchange resin; and,     means for returning the treated pulping chemicals to the process loop.

\* \* \* \* \*